(12) United States Patent
Cornett et al.

(10) Patent No.: US 10,239,745 B2
(45) Date of Patent: Mar. 26, 2019

(54) FUELING STATION SUMP DEHUMIDIFYING SYSTEM

(71) Applicant: Veeder-Root Company, Simsbury, CT (US)

(72) Inventors: Kenneth D. Cornett, Simsbury, CT (US); Kent Reid, Canton, CT (US)

(73) Assignee: Veeder-Root Company, Simsbury, CT (US)

( * ) Notice: Subject to any disclaimer, the term of this patent is extended or adjusted under 35 U.S.C. 154(b) by 232 days.

(21) Appl. No.: 15/408,594

(22) Filed: Jan. 18, 2017

(65) Prior Publication Data

US 2017/0203952 A1  Jul. 20, 2017

Related U.S. Application Data

(60) Provisional application No. 62/279,914, filed on Jan. 18, 2016.

(51) Int. Cl.
| | | |
|---|---|---|
| *B67D 7/32* | (2010.01) | |
| *B01D 53/28* | (2006.01) | |
| *B67D 7/04* | (2010.01) | |
| *B67D 7/78* | (2010.01) | |
| *C01D 7/00* | (2006.01) | |
| *C01F 11/24* | (2006.01) | |
| *C09K 15/02* | (2006.01) | |

(52) U.S. Cl.
CPC ............... *B67D 7/32* (2013.01); *B01D 53/28* (2013.01); *B67D 7/0498* (2013.01); *B67D 7/3209* (2013.01); *B67D 7/78* (2013.01); *C01D 7/00* (2013.01); *C01F 11/24* (2013.01); *C09K 15/02* (2013.01); *B01D 2253/10* (2013.01); *B01D 2253/202* (2013.01)

(58) Field of Classification Search
CPC .. B67D 7/76; B67D 7/766; B67D 7/78; B67D 7/04; B67D 7/0498; B67D 7/3209; B01D 2253/202; B01D 2253/10
See application file for complete search history.

(56) References Cited

U.S. PATENT DOCUMENTS 2,976,950 A *  3/1961  Smith ................... B60P 3/2255
                                        137/209
4,390,417 A     6/1983  Sweeney
(Continued)

OTHER PUBLICATIONS

NIST, NIST Corrosion Lab Tests Suggest Need for Underground Gas Tank Retrofits, webpage, Jul. 29, 2014, available at www.nistgov/news-events/news/2014/07/nist-corrosion-lab-tests-suggest-need-underground-gas-tank-retrofits.

(Continued)

*Primary Examiner* — Timothy L Maust
*Assistant Examiner* — Timothy P Kelly
(74) *Attorney, Agent, or Firm* — Nelson Mullins Riley & Scarborough, LLP

(57) ABSTRACT

Systems and methods for preventing biocorrosion of fuel handling components located in a sump in a fuel dispensing environment. One method includes exposing a hygroscopic material to moisture-laden air in the sump such that the hygroscopic material deliquesces into a liquid solution and exposing a buffer material to ethanol-blended fuel vapors in the sump. The method also includes collecting the liquid solution in a reservoir and monitoring the level of the liquid solution in the reservoir using a liquid level sensor. Further, the method includes notifying service personnel of the level of the liquid solution in the reservoir.

16 Claims, 6 Drawing Sheets

(56) References Cited

U.S. PATENT DOCUMENTS

| | | | | |
|---|---|---|---|---|
| 4,501,305 | A | * | 2/1985 | Zola ................. B65D 90/105 |
| | | | | 141/392 |
| 5,367,882 | A | | 11/1994 | Lievens et al. |
| 6,116,815 | A | | 9/2000 | Chen |
| 6,126,409 | A | | 10/2000 | Young |
| 6,767,521 | B1 | | 7/2004 | Vogt et al. |
| 7,008,464 | B2 | | 3/2006 | Deetz |
| 8,601,867 | B2 | | 12/2013 | Prinstil et al. |
| 8,721,267 | B2 | | 5/2014 | Moss et al. |
| 2004/0228686 | A1 | | 11/2004 | Argandona |
| 2014/0311963 | A1 | | 10/2014 | Bortnik et al. |
| 2018/0257925 | A1 | * | 9/2018 | Schultz ............ B01D 35/005 |

OTHER PUBLICATIONS

John Wilson et al., Corrosion in STP Sumps: What Causes It and What Can Be Done About It?, PEI Journal, Third Quarter 2013, at pp. 26-34, available at https://archive.epa.gov/ada/web/pdf/corrosion-in-stp-sumps-2.pdf.

Ed Fowler et al., Ethanol Related Corrosion in Submersible Turbine Pump Sumps (STPs), State of Tennessee Division of Underground Storage Tanks 2011 ASTSWMO Meeting Presentation, Mar. 2011, available at http://www.astswmo.org/Files/Meetings/2011/2011-UST_CP_Workshop/FOWLER-STPcorrosionEPA3.SGPP.pdf.

Ellen Frye, Not for the Squeamish! Those Alcohol-Loving Acetobacters at Work . . . or What?, LUSTLine Bulletin 65, Jun. 2010, at pp. 13-14.

International Preliminary Report on Patentability, dated Jul. 24, 2018, issued in corresponding International App. No. PCT/US2017/013939.

Siegert, W., et al., Microbial Contamination in Diesel Fuel—Are New Problems Arising From Biodiesel Blends?, Schülke & Mayr GmbH.

Veeder-Root Company, Hydrostatic Sensor, Online Catalogue, dated 2003, available at www.veeder.com/gold/download.cfm?doc_id=8743 (last accessed Aug. 8, 2018).

Invitation to Pay Additional Fees dated Apr. 5, 2017, in corresponding PCT Application No. PCT/US17/13939.

* cited by examiner

FUELING STATION SUMP DEHUMIDIFYING SYSTEM

CROSS-REFERENCE TO RELATED APPLICATIONS

The present application claims the benefit of U.S. Provisional Application Ser. No. 62/279,914, filed Jan. 18, 2016, entitled "Fueling Station Sump Dehumidifying System." The foregoing application is hereby relied upon and incorporated by reference herein in its entirety for all purposes.

FIELD OF THE INVENTION

The present invention relates generally to fueling environments and to sumps used therein. More specifically, the present invention relates to systems and methods for eliminating corrosion of metal components located in sumps, including but not limited to corrosion caused by organic acids created by microorganisms.

BACKGROUND

In a fueling environment, a sump is a below-ground area in which mechanical or fuel handling equipment may be located and accessed. Some sumps are contained, meaning they have sides and a bottom designed to both keep water from entering the sump and/or to prevent certain liquids, such as liquid fuel, from leaking into the environment. Often, sumps are provided with a removable cover located at or above grade level.

Sumps are often used with a number of different components, such as fuel dispensers, fuel piping, and fuel storage tanks. A dispenser sump, for instance, is located directly beneath a fuel dispenser and may provide access to fuel piping, flex connectors, shear valves, and other fuel handling equipment. An intermediate sump may be provided at a point (such as a low point, branch, or tee) along fuel piping that runs between fuel storage tanks and fuel dispensers. These sumps may provide access to the fuel piping. Similarly, a transition sump may provide a location at which below-ground piping may transition to above-ground piping or at which the type of piping may change.

Fuel storage tanks, which are typically located beneath the ground, and thus, are commonly referred to as "underground storage tanks" (USTs), may be equipped with two or more sumps. For example, a sump may be provided for components of a submersible turbine pump, and a separate sump may be provided for components of a magnetostrictive probe or another type of fuel gauge. Further, components similar to sumps, sometimes referred to as spill buckets, may be provided at the ground-level opening to fuel-filling pipes that extend into USTs and/or at the opening to vapor recovery pipes that extend into the UST ullage.

SUMMARY

According to one embodiment, the present invention comprises a system for use in a fuel dispensing environment sump. The system comprises fuel piping extending from at least one storage tank to at least one fuel dispenser, and fuel handling equipment in fluid communication with the fuel piping. The fuel handling equipment is at least partially enclosed by the sump. A hygroscopic material is disposed in and exposed to air in the sump, and the sump comprises a reservoir disposed beneath the hygroscopic material. A buffer material having a pH greater than 7 is also disposed in and exposed to air in the sump.

In yet another embodiment, the present invention comprises a system for use in a sump in a fuel dispensing environment. The system comprises at least one housing having a plurality of openings defined therein. A first material is disposed in the at least one housing, and the first material comprises calcium chloride. A second material is disposed in the at least one housing, and the second material comprises sodium bicarbonate. A reservoir is coupled with the at least one housing. The plurality of openings defined in the at least one housing permit the first and second materials to be exposed to moisture-laden air and vapors comprising organic acids. Finally, a liquid level sensor is coupled with the reservoir. The liquid level sensor is configured for electronic communication with a remote computing device.

According to a further embodiment, the present invention comprises a method of preventing biocorrosion of fuel handling components located in a sump in a fuel dispensing environment. The method comprising the steps of exposing a hygroscopic material to moisture-laden air in the sump such that the hygroscopic material deliquesces into a liquid solution, and exposing a buffer material to ethanol-blended fuel vapors in the sump. The method also comprises collecting the liquid solution in a reservoir and monitoring the level of the liquid solution in the reservoir using a liquid level sensor. Finally, the method comprises notifying service personnel of the level of the liquid solution in the reservoir.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
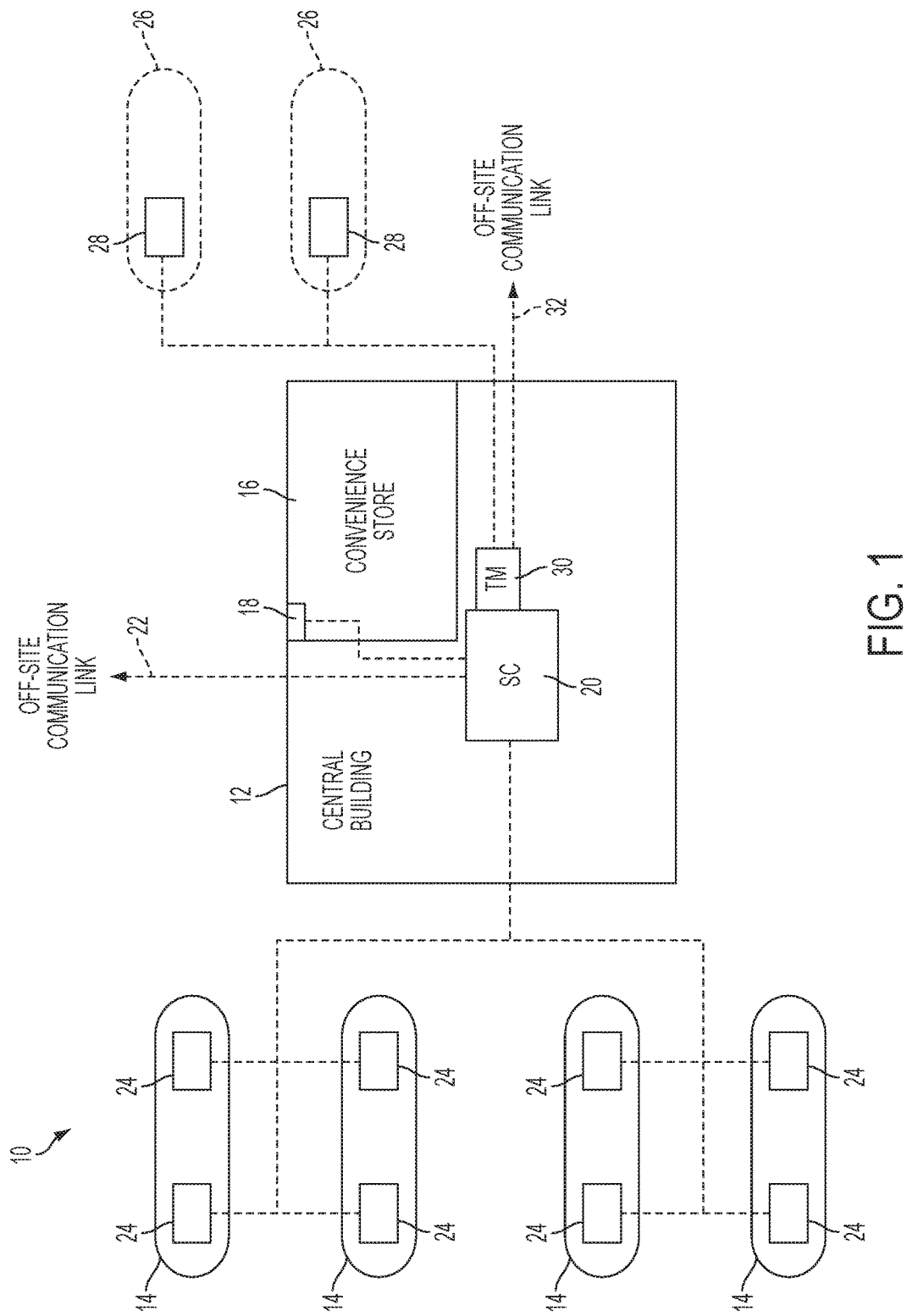
FIG. 1 is a schematic illustration of an exemplary fueling environment in which embodiments of the present invention may be used.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

In general, embodiments of the present invention relate to a dehumidifying system for sumps. Some embodiments of the present invention are particularly suitable for use with sumps in a retail service station environment, and the below discussion will describe preferred embodiments in that context. However, those of skill in the art will understand that the present invention is not so limited. In fact, it is contemplated that the present invention be used with any appropriate fluid dispensing environment. Additionally, it is contemplated that the present invention be used with any suitable area for accessing equipment, including but not limited to spill buckets, transition/intermediate sumps, and any other area where humidity and other factors can contribute to corrosive conditions for equipment.

FIG. 1 provides a schematic illustration of an exemplary fueling environment 10 in which embodiments of the present invention may be used. Fueling environment 10 comprises a central building 12 and a plurality of fueling islands 14. The central building 12 may comprise a convenience store 16 having a point-of-sale (POS) 18. Further, the central building 12 may house a site controller 20, which in an exemplary embodiment may be the PASSPORT® POS system sold by Gilbarco Inc. of Greensboro, N.C., although third party site controllers may be used. Site controller 20 may control the authorization of fueling transactions and other conventional activities as is well understood, and may be incorporated into a POS, if needed or desired. Site controller 20 may be associated with an off-site communication link 22 allowing communication with a remote location for credit/debit card authorization, content provision, reporting purposes, or the like. Communication link 22 may be routed through the Public Switched Telephone Network, the Internet, both, or the like, as needed or desired.

Fueling islands 14 may have one or more fuel dispensers 24 positioned thereon. For example, fuel dispensers 24 may be the ENCORE® dispensers sold by Gilbarco Inc. Fuel dispensers 24 are in electronic communication with site controller 20.

The fueling environment 10 comprises one or more fuel storage tanks 26 adapted to store liquid fuel therein. In a typical installation, fuel storage tanks 26 are positioned underground, and may thus be referred to as USTs. In addition, a magnetostrictive probe 28 is associated with each UST 26 and is in electronic communication with a tank monitor 30.

Tank monitor 30, which may be in direct or indirect electronic communication with fuel dispensers 24, is provided with the hardware, software, and memory needed to reconcile the amount of fuel dispensed with current levels of fuel within USTs 26 and perform other fuel monitoring functions, as described in more detail below. Tank monitor 30 preferably communicates with the site controller 20, and may further have an off-site communication link 32 for reporting inventory, leak detection, or the like. An example of a tank monitor 30 is the TLS-450 manufactured by the Veeder-Root Co. of Simsbury, Conn. Communication link 32 is preferably analogous to communication link 22, and in some embodiments communication links 22, 32 may be a single communication link. Finally, as described in more detail below, tank monitor 30 may preferably be in communication with other components associated with USTs 26, such as a submersible turbine pump and/or a dehumidifying system as described herein.

Figure 2:
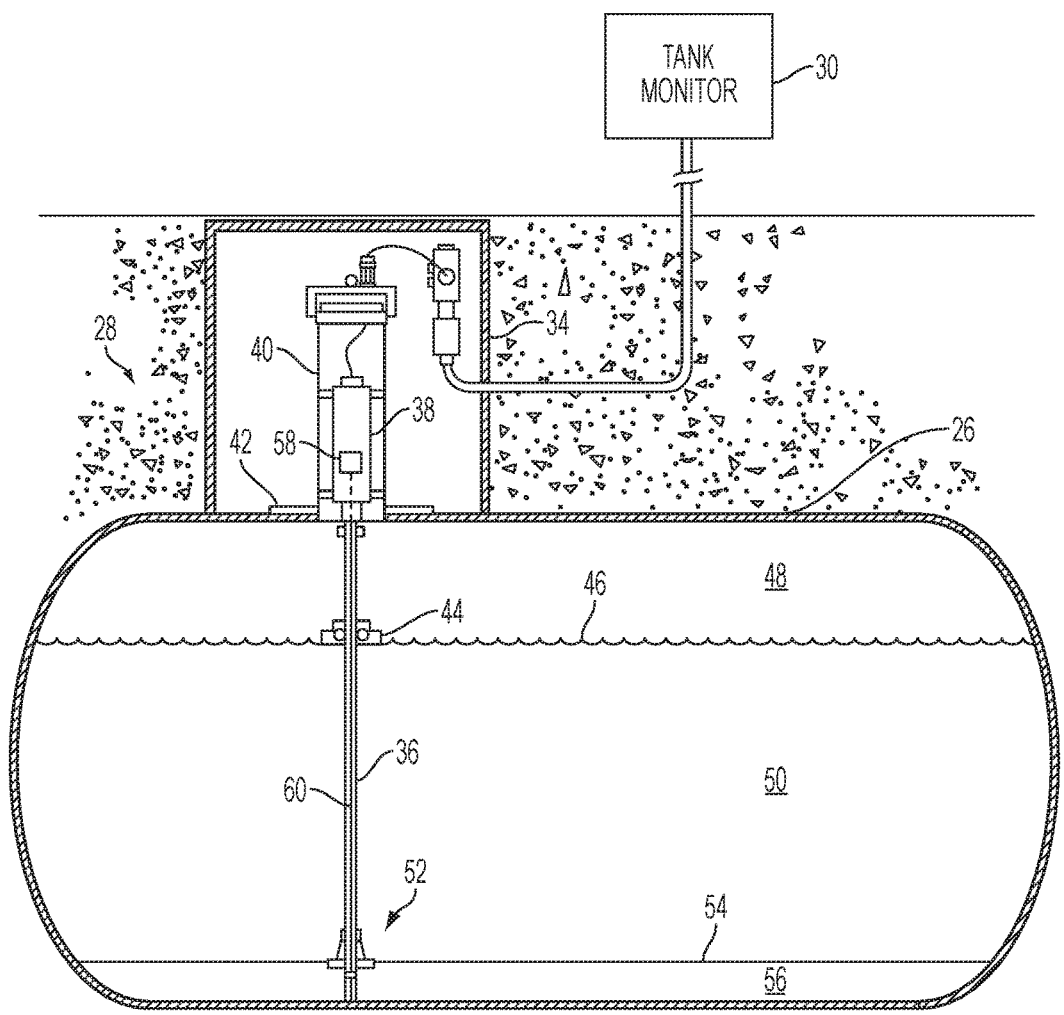
FIG. 2 is a schematic illustration of a sump connected with an underground storage tank in which an embodiment of the present invention may be used.

FIG. 2 provides a schematic illustration of a sump 34 connected with UST 26 in which an embodiment of the present invention may be used. More particularly, sump 34, which as shown is a contained sump and which may be double-walled in some embodiments, is coupled with a top surface of UST 26. Sump 34 houses components of magnetostrictive probe 28. Here, probe 28 includes a probe shaft 36 that extends into the UST 26. A canister 38 is positioned in sump 34 and is coupled to probe shaft 36. Probe 28 may be housed in a riser pipe 40, which is secured to the UST 26 via flange 42.

Those of skill in the art understand that a magnetostrictive probe generates data regarding the level of one or more floats in a fuel storage tank. In this regard, an annular fuel level float 44 is positioned on the probe shaft 36 and may be configured to float at a first fluid interface 46 between the tank 26 ullage 48 and liquid fuel 50. In addition, in some embodiments, probe 28 may comprise a second float assembly 52 operative to detect development of a second fluid interface 54 between liquid fuel 50 and a second fluid 56, which may be water or phase separation. Control electronics 58 are typically associated with probe 28 to control the operation thereof. In general, control electronics 58 are operative to measure the time elapsed between an interrogation pulse transmitted along a ferromagnetic wire 60 and the arrival of torsional waves from permanent magnets associated with floats 44, 52. Control electronics 58 are in electronic communication with tank monitor 30 and communicate measured data signals generated in the operation of probe 28 to tank monitor 30 for further processing. Additional information regarding the operation of magnetostrictive probe 28 is provided in commonly-owned U.S. Pat. No. 8,601,867, the entire disclosure of which is incorporated by reference herein for all purposes.

Figure 3:
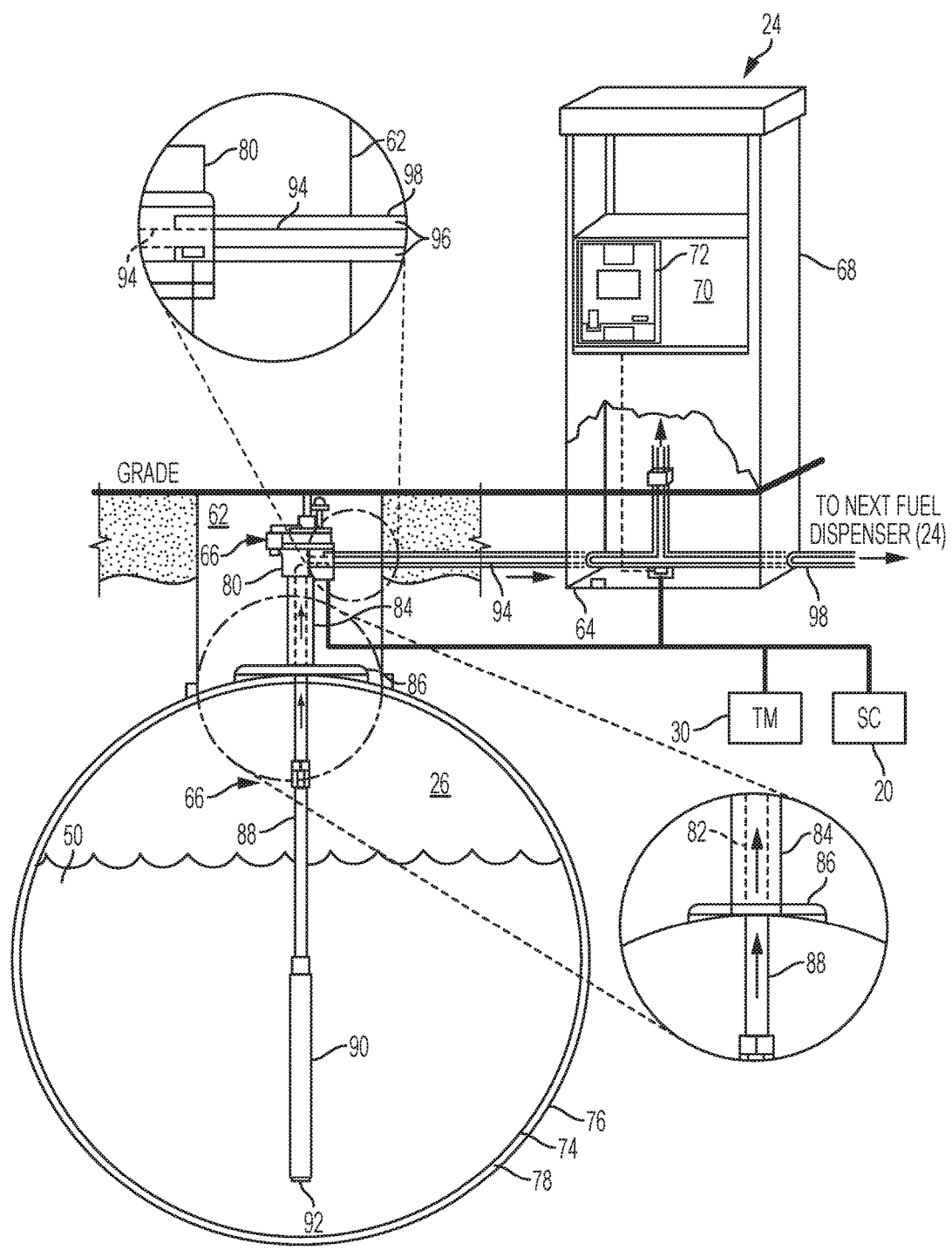
FIG. 3 is a schematic illustration of a sump connected with an underground storage tank and a sump connected with a fuel dispenser in which additional embodiments of the present invention may be used.

FIG. 3 is a schematic illustration of a sump 62 connected with an underground storage tank 26 and a sump 64 connected with a fuel dispenser 24 in which additional embodiments of the present invention may be used. Sump 62 houses and provides access to components of a submersible turbine pump (STP) 66, and sump 64 (located directly beneath fuel dispenser 24) provides access to fuel piping and other fuel handling equipment. In particular, as noted above, fuel dispenser 24 delivers fuel 50 from a UST 26 to a vehicle. Fuel dispenser 24 has a dispenser housing 68 that typically contains an electronic control system 70 and a display 72. Various fuel handling components, such as valves and meters, are also located inside of housing 68. These fuel handling components allow fuel 50 to be received from underground piping and delivered through a hose and nozzle to a vehicle, as is well understood.

As noted above, fuel 50 is stored in UST 26. In this case, UST 26 is a double-walled tank having an inner vessel 74 that holds the fuel 12 surrounded by an outer casing 76. Any leaked fuel 50 from a leak in inner vessel 74 will be captured in an interstitial space 78 that is formed between inner vessel 74 and outer casing 76. More information on underground storage tanks in service station environments can be found in U.S. Pat. No. 6,116,815, incorporated herein by reference in its entirety for all purposes.

STP 66 is provided to draw fuel 50 from UST 26 and deliver it to fuel dispenser(s) 26. One example of a STP may be the RED JACKET® line of submersible turbine pumps manufactured by the Veeder-Root Co. Another example of a prior art STP is disclosed in U.S. Pat. No. 6,126,409, incorporated herein by reference in its entirety for all purposes. STP 66 includes a distribution head 80 that incorporates power and control electronics. The distribution head 80 is typically placed inside sump 62. Electronics in the distribution head 80 may be communicatively coupled to tank monitor 30, site controller 20, or other control system via a suitable communication line.

Distribution head 80 is fluidly connected to a column pipe 82 which provides fluid communication to fuel 50 inside of UST 26. Column pipe 82 is surrounded by a riser pipe 84 which is mounted (using a mount 86) to the top of the UST 26. In particular, the column pipe 82 extends down into the UST 26 and is terminated with a boom 88. Boom 88 is coupled to a pump housing 90 that contains a motor and at least one impeller. The inlet 92 of pump housing 90 is located near the bottom of UST 26 as shown.

In operation, impeller(s) inside the housing 90 rotate to draw fuel 50 into the housing inlet 92 and thus into the boom 88. The fuel 50 is pushed through column pipe 82 and delivered to the main fuel piping conduit 94. As shown, main fuel piping conduit 94 is a double-walled piping having an interstitial space 96 formed by outer wall 98 to capture any leaked fuel. Finally, main fuel piping conduit 94 is coupled to the fuel dispenser(s) 24 in the service station whereby fuel 50 is delivered to a vehicle. As shown in FIG. 3, main fuel piping conduit, along with other fuel handling components not specifically shown, can be accessed beneath dispenser(s) 24 via sump 64.

Notably, equipment housed in or accessed via sumps analogous to those described above can be subject to corrosion under certain conditions. Such corrosion, which in some cases can be rapid and severe, can result in equipment failures, leaks, and contamination of groundwater, among other problems. Correspondingly, such corrosion may lead to required replacement of expensive components, such as submersible turbine pump casings, sooner than expected. One source of corrosion can be traced to the advent and increasingly common use of gasoline-ethanol blends, as opposed to unblended gasoline, as fuel in retail fueling environments.

More particularly, when atmospheric conditions (e.g., atmospheric temperature and pressure) are sufficient, humid air and ethanol-blended fuel vapors in a sump can condense on the surfaces of the equipment in the sump. This often happens, for example, with fuel handling components that are chilled in normal operation due to contact with fuel that is colder from having been stored in a UST. The combination of ethanol and water condensed on a surface can be particularly conducive to microbial activity, particularly with ambient temperatures between 60° F. and 120° F.

In this regard, some microorganisms can metabolize ethanol and produce organic acids as a waste product. For example, *Acetobacter* is a genus of aerobic bacteria, and *Acetobacter aceti* is a species of such bacteria that is both prevalent in the environment and that metabolizes ethanol, producing acetic acid as a waste product. Organic acids, including acetic acid, are highly corrosive to cast iron, steel, and copper, materials commonly used in fuel handling components. Accordingly, presence of such bacteria in condensed water and ethanol-blended fuel vapors can cause rapid corrosion of equipment in sumps. Moreover, acetic acid may also be transported to other corrodible parts via evaporation and subsequent re-condensation.

Embodiments of the present invention eliminate corrosive conditions in sumps that can be caused by organic acids produced by microorganisms. In one aspect, the present invention may interrupt and/or prevent the creation of organic acids by reducing the humidity of the environment within a closed sump. In another aspect, an alkaline buffer material (e.g., with a pH greater than 7) may be used to "scavenge" (e.g., react with) organic acids in vapors that either already exist or that cannot be completely prevented. Therefore, embodiments of the present invention may minimize the impact of organic acids on susceptible equipment in sumps.

Figure 4:
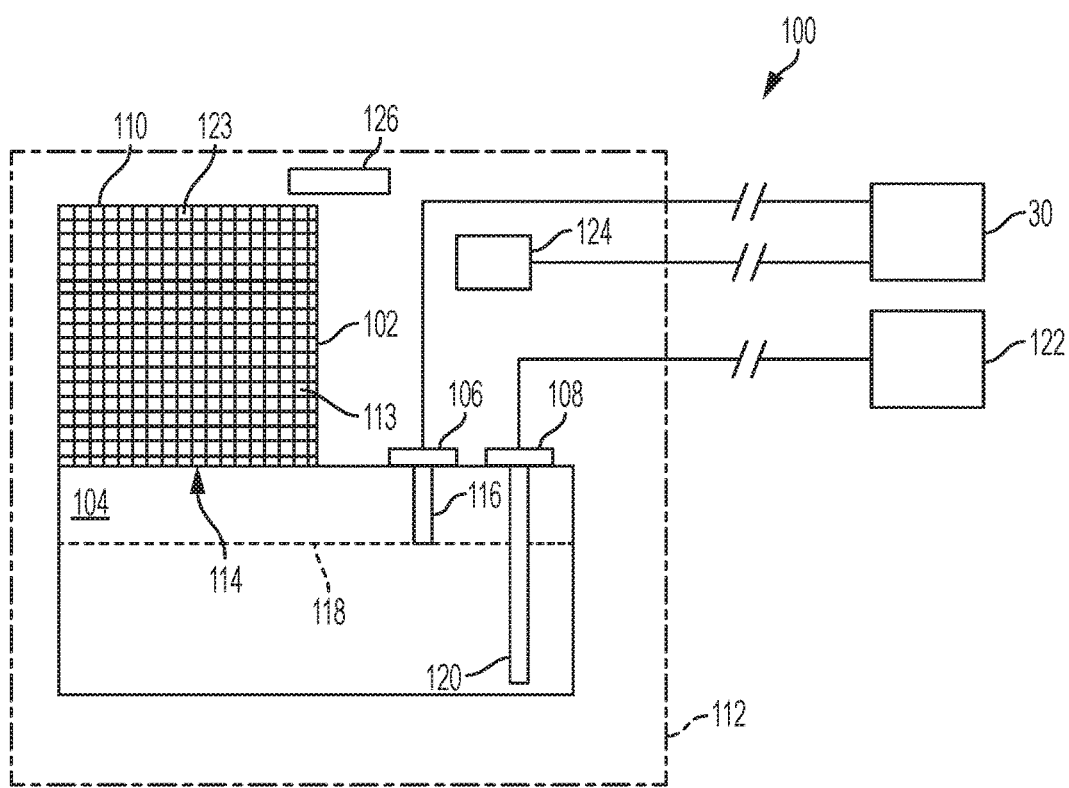
FIG. 4 is a schematic cross-sectional view of a dehumidifying system according to one embodiment of the present invention.

According to one embodiment, a schematic cross-sectional view of a dehumidifying system 100 is illustrated in FIG. 4. As shown, dehumidifying system 100 comprises a first housing 102 disposed above a reservoir 104. In addition, a liquid level detector 106 and, in some embodiments, a tap 108 may also be coupled with reservoir 104 for detecting the volume or level of liquid in reservoir 104 and drawing liquid therefrom, respectively. Further, in some embodiments, a second housing 110 (shown here disposed above first housing 102) may also be provided. These components of dehumidifying system 100 are disposed within a sump 112, which may be analogous to sumps 34, 62, and/or 64 described above. Additional detail regarding the components of dehumidifying system 100 is provided below.

First housing 102 preferably contains or comprises a hygroscopic material 113 in fluid communication with the air in sump 112. In this regard, housing 102 may be perforated in a manner that allows the hygroscopic material 113 to absorb or adsorb water from the air in sump 112. For example, in one embodiment housing 102 may be similar to the perforated jacket described in U.S. Pat. No. 6,767,521 to Vogt et al., the entire disclosure of which is incorporated by reference herein for all purposes. However, those of skill in the art are familiar with and can select a suitable perforated housing for a hygroscopic material.

Those of skill in the art are also familiar with suitable hygroscopic materials for absorbing or adsorbing water in the air in sump 112. In one embodiment, the hygroscopic material 113 may be a calcium chloride compound or comprise similar salts. As those of skill in the art will appreciate, a calcium chloride compound may deliquesce or dissolve in the water. In another embodiment, the hygroscopic material 113 may be a gel-forming polymer. In yet other embodiments, hygroscopic materials 113 may be analogous to those used in commercially available products sold under the trademarks DampRid, Humydry, and NoDamp. In still other embodiments, the hygroscopic material 113 may be similar to the moisture absorbing materials described in the '521 patent incorporated by reference herein, and in some cases the hygroscopic material 113 may be provided in a semi-permeable membrane.

In any event, and as noted above, housing 102 may preferably be disposed above and, in some cases, coupled with, a reservoir 104 so that reservoir 104 may collect moisture absorbed from the air in sump 112 (or may collect gel, depending on the hygroscopic material selected). In this regard, housing 102 may define one or more openings 114 on the underside thereof to allow a liquid solution formed from the absorption of water from the air (e.g., brine, in the case that the hygroscopic material is a salt), a gel, or another liquid to pass into (e.g., by force of gravity) reservoir 104. In addition, liquid level detector 106, which as noted above is coupled with reservoir 104, may preferably comprise a transducer or sensor 116 that extends into reservoir 104 at least a predetermined distance and which is operative to detect that water, gel, or other liquid has reached the predetermined distance from the top of reservoir 104. The predetermined distance may correspond to a service level threshold (represented by dashed line 118 in FIG. 4), or a level at which reservoir 104 is deemed to be sufficiently full such that maintenance is required. (During maintenance, for example, service personnel may dispose of the liquid in reservoir 104 and/or replenish the hygroscopic material 113 in housing 102.) In some embodiments, transducer or sensor 116 may be an optical sensor or an ultrasonic sensor.

Liquid level detector 106 is preferably in wired or wireless electronic communication with a remote monitoring device, such as tank monitor 30 (shown in FIG. 4), a site controller, or another remote computer. Those of skill in the art can select a suitable commercially available liquid level detector for embodiments of the present invention. In one embodiment, for example, liquid level detector 106 may be analogous to one of the sump monitoring or hydrostatic monitoring sensors offered by Veeder-Root. For example, in one embodiment, liquid level detector 106 may be a discriminating and/or non-discriminating sump monitoring or dispenser pan monitoring sensor.

In another embodiment, rather than extending only a predetermined distance into reservoir 104, transducer 116 may extend into reservoir 104 substantially its entire depth. Liquid level detector 106, either alone or in conjunction with tank monitor 30, may then determine the depth of brine, gel, or other liquid in reservoir 104 at all times and may signal appropriate personnel that maintenance is needed only when the brine, gel, or other liquid reaches a predetermined depth. In some embodiments, liquid level detector 106 may also be able to measure the rate of change of the depth of brine, gel, or other liquid in reservoir 104 to allow tank monitor 30 to project a "service needed date" in advance of the need for service. Alternatively, other types of sensors may be used for liquid level detector 106, such as float sensors.

In yet another embodiment, rather than including a liquid level detector 106, dehumidifying system 100 may comprise a weight sensor operative to measure one or more of the change in weight of reservoir 104 due to collection of water, gel, or other liquid and the rate of change in weight of reservoir 104 due to such collection. These embodiments may likewise be useful, for example, to notify service personnel of a future date service may be required.

Reservoir 104 is preferably easily drained, and it may, for example, comprise a drain for that purpose. (However, it will be appreciated that the contents of reservoir 104 should not be allowed to spill into sump 112, as the brine, gel, or other liquid therein may be corrosive to some equipment over time.) In another embodiment, reservoir 104 may be part of a modular, replaceable unit that may be easily emptied and reconnected with dehumidifying system 100 or simply thrown away. Correspondingly, liquid level detector 106 may also be easily switched between and/or connected to modular components of dehumidifying system 100, such as reservoir 104.

In yet another embodiment, as noted above, a tap 108 may be coupled with reservoir 104. Tap 108 may comprise a tube 120 that extends into reservoir 104 and that terminates near a bottom surface thereof. Further, tap 108 may be fluidly coupled with a suction source 122, such as a pump, which may be remotely actuated and/or in electronic communication with tank monitor 30. Thereby, brine, gel, or other liquid in reservoir 104 may be periodically (or continuously) drawn from reservoir 104 via tube 120 of tap 108.

In another aspect, dehumidifying system 100 may comprise an alkaline buffer material 123 in addition to the hygroscopic material 113 (or in the alternative) for neutralizing acidic vapors in sump 112 that may be present and/or that are not preventable. In some embodiments, the alkaline buffer material 123 may be disposed within second housing 110, which may be perforated to expose the air in sump 112 to the buffer material, as described above. In other embodiments, however, second housing 110 is not required, and the alkaline buffer material 123 may be mixed with the hygroscopic material 113 in first housing 102. Although second housing 110 is shown in FIG. 4 disposed above first housing 102, it will be appreciated that this is not required in all embodiments. Second housing 110 may be disposed in other locations on or within dehumidifying system 100, and if second housing 110 is not provided, the alkaline buffer material 123 may also be disposed elsewhere in dehumidifying system 100, as long as it is exposed to the air in sump 112.

Those of skill in the art are familiar with alkaline buffer materials suitable for use in dehumidifying system 100. In one embodiment, for example, the alkaline buffer material 123 may be a mildly basic buffer (e.g., with a pH of approximately 8 to 10), such as sodium bicarbonate powder. However, other buffer materials may be used.

In use, dehumidifying system 100 may be disposed within sump 112 and connected, as appropriate, with remote monitoring devices such as tank monitor 30 (or any remote computing device). If tap 108 is provided, dehumidifying system 100 may also be connected with suction source 122. Dehumidifying system 100 may be mounted on a surface (e.g., a wall or floor) of sump 112 or it may be suspended therein. In addition, in some embodiments various components of dehumidifying system 100 may be disposed in separate locations within sump 112. In any event, housings 102, 110 are preferably easily accessed for replenishment and/or replacement of hygroscopic and buffer materials, respectively. Moreover, housings 102, 110 may each or both be replaceable, modular components, either alone or in combination with reservoir 104. Further, it is contemplated that, in some embodiments, all or any part of dehumidifying system 100 may comprise a disposable, self-contained unit.

Once dehumidifying system 100 is installed in sump 112, it is operative to interrupt the creation of organic acids, such as acetic acid, by microorganisms in sump 112. In particular, by reducing the amount of moisture in the air in sump 112, it is less likely water and ethanol-blended fuel vapor will condense on equipment surfaces. The conditions in sump 112, in other words, are less likely to be conducive to microorganism activity. Likewise, if the alkaline buffer material 123 is included, it is operative to scavenge organic acid vapors to minimize their impact on susceptible equipment in sump 112. Specifically, the alkaline buffer materials 123 will react with the acidic vapors, neutralizing them before they can contribute to equipment corrosion.

In yet another embodiment, dehumidifying system 100 may comprise a relative humidity sensor 124 (or a dew point and temperature sensor) to monitor the sump atmosphere. As shown in FIG. 4, relative humidity sensor 124 is preferably in wired or wireless electronic communication with a remote monitoring device, such as tank monitor 30, a site controller, or another remote computer. Thus, appropriate personnel may receive information regarding the atmospheric conditions inside sump 112, which may be useful in predicting the need for maintenance of susceptible components in sump 112 and/or servicing of dehumidifying system 100. Those of ordinary skill in the art are familiar with and can select suitable sensors for this purpose.

In still other embodiments, air within sump 112 may be circulated to enhance the communication between the air and the hygroscopic and/or buffer materials. For example, dehumidifying system 100 may comprise a suitable air moving device 126 operative to cause movement of air within sump 112. Air moving device 126 may be active (such as a fan, vacuum, or the like) or passive (such as a vent), depending on the application. Where an active air moving device 126 is provided, it may be operative to move air continuously or at predetermined times or it may be in communication with a suitable control system to be remotely actuated.

Figure 5:
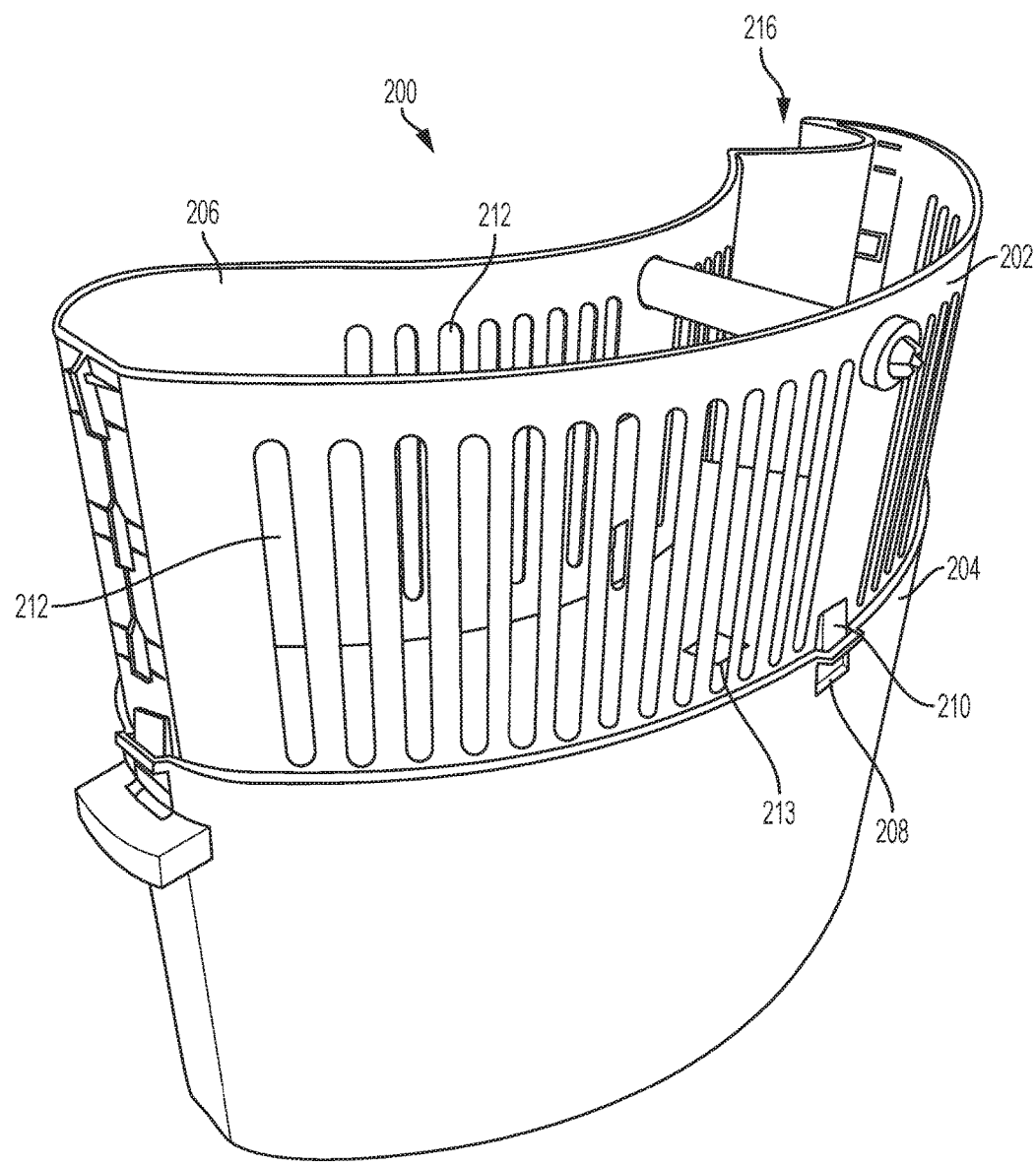
FIG. 5 is a front isometric view of a dehumidifying system according to an embodiment of the present invention.
Figure 6:
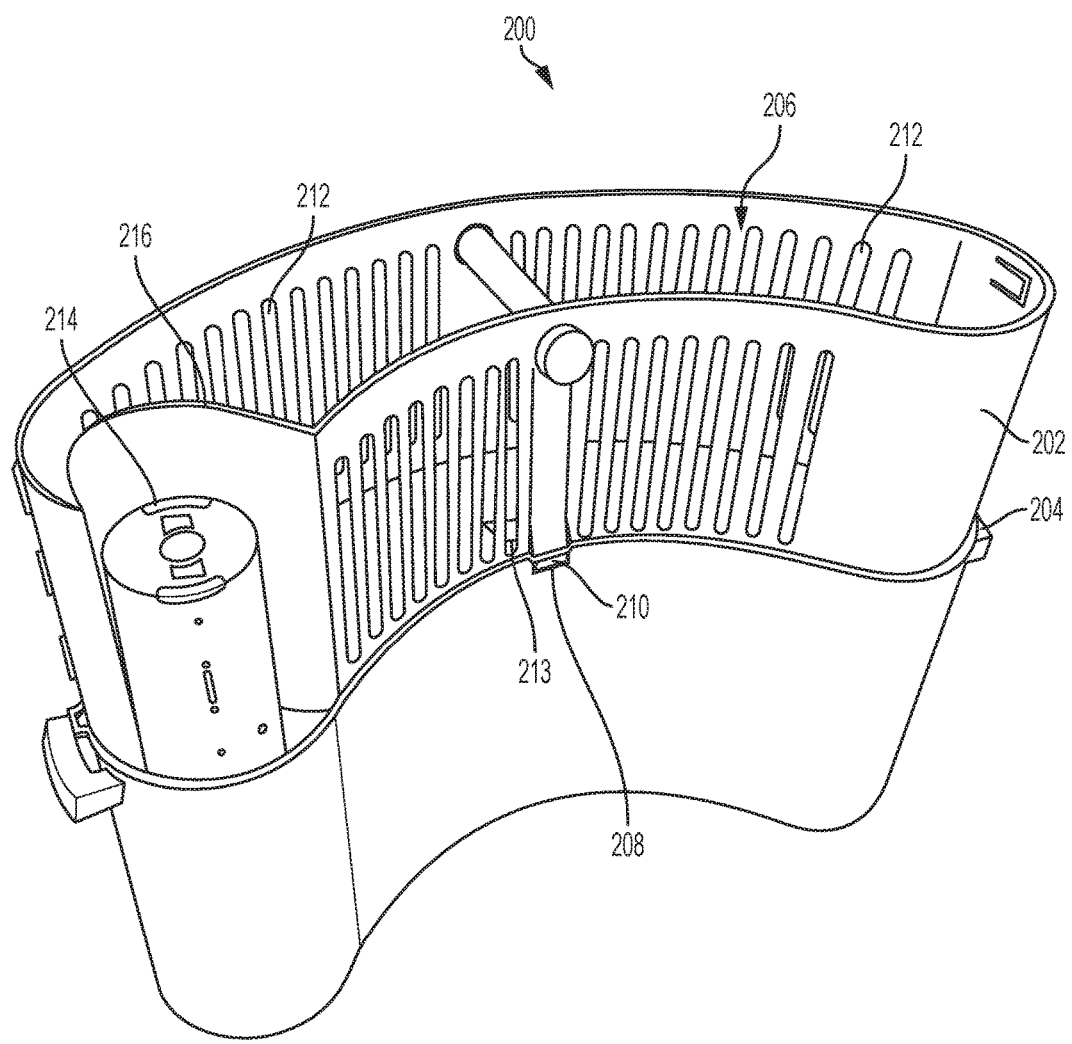
FIG. 6 is a rear isometric view of the dehumidifying system of FIG. 5.

Another embodiment of the present invention is shown in FIGS. 5 and 6. In this regard, FIGS. 5 and 6 are respective front and rear isometric views of a dehumidifying system 200. As with dehumidifying system 100, described above, dehumidifying system 200 may be disposed within a sump (analogous to sumps 34, 62, and/or 64) to reduce or eliminate corrosive conditions that can be caused by organic acids produced by microorganisms. Here, dehumidifying system 200 comprises a housing 202 coupled with a reservoir 204. Housing 202 and reservoir 204 in this embodiment are generally semicircular in shape when viewed from above, and they may be coupled together by any suitable means. Preferably, however, reservoir 204 is releasably coupled with housing 202 so that reservoir 204 may be emptied and/or serviced, as described above. For example, reservoir 204 may define a plurality of slots 208 which engage tabs 210 projecting from housing 202, though many other methods of coupling are suitable. Housing 202 comprises a base and walls that extend vertically to define an open top 206, which in some embodiments may be provided with a lid or cap (not shown). A plurality of vertically-extending openings 212 are defined in the walls of housing 202.

Although not shown in FIGS. 5 and 6, it will be appreciated that, in use, housing 202 may be filled with a hygroscopic material and/or an alkaline buffer material, for example via open top 206. Openings 212 may permit the hygroscopic and/or alkaline buffer materials to be exposed to moisture-laden air and vapors comprising organic acids in a sump. A drain 213 defined in the base of housing 202 may provide fluid communication between housing 202 and reservoir 204. The drain preferably allows water, gel, or other liquid (e.g., deliquesced from the hygroscopic material) to pass from housing 202 into and collect in reservoir 204. It will be appreciated that reservoir 204 can be easily emptied and reconnected with dehumidifying system 200 or simply thrown away.

Further, as best seen in FIG. 6, a liquid level detector 214 may be coupled with reservoir 204. Here, liquid level detector 214 is an optical sump sensor commercially available from Veeder-Root. As with liquid level detector 106, described above, liquid level detector 214 may comprise a transducer or sensor that extends into reservoir 204. In this embodiment, housing 202 defines a "U"-shaped cutout portion, or slot, 216 sized to engage the upper portion of liquid level detector 214 when the lower portion of liquid level detector 214 is in engagement with a wall of reservoir 204. Housing 202 and reservoir 204 may thereby cooperate to support liquid level detector 214 in position. In use, when dehumidifying system 200 is secured in a sump, liquid level detector 214 may be placed in position in cutout portion 216 and reservoir 204 and then connected (e.g., via a wired or wireless connection) with a remote computing device, such as tank monitor 30 described above.

Based on the above, it will be appreciated that embodiments of the invention provide systems and methods for eliminating corrosive conditions in sumps. Although certain embodiments of the invention were discussed in the context of acetic acid produced by *Acetobacter* bacteria, those of skill in the art will appreciate that embodiments of the present invention are not limited to a particular bacteria or organic acid. While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A system for use in a fuel dispensing environment sump, the system comprising:
   fuel piping extending from at least one storage tank to at least one fuel dispenser;
   fuel handling equipment in fluid communication with the fuel piping, the fuel handling equipment at least partially enclosed by the sump;
   a hygroscopic material disposed in and exposed to air in the sump, the sump comprising a reservoir disposed beneath the hygroscopic material; and
   a buffer material having a pH greater than 7, the buffer material disposed in and exposed to air in the sump.

2. The fuel dispensing environment of claim 1, wherein the hygroscopic material is disposed within a first housing.

3. The fuel dispensing environment of claim 2, wherein the buffer material is disposed within a second housing.

4. The fuel dispensing environment of claim 1, wherein the fuel is a gasoline-ethanol blend.

5. The fuel dispensing environment of claim 1, further comprising a liquid level detector coupled with the reservoir.

6. The fuel dispensing environment of claim 5, further comprising a tank monitor in electronic communication with the liquid level detector.

7. The fuel dispensing environment of claim 6, further comprising a relative humidity sensor disposed within the sump, the relative humidity sensor in electronic communication with the tank monitor.

8. The fuel dispensing environment of claim 1, further comprising a tap coupled with the reservoir, wherein the tap is in fluid communication with a suction source operative to selectively empty contents of the reservoir.

9. The fuel dispensing environment of claim 1, wherein the hygroscopic material comprises calcium chloride.

10. The fuel dispensing environment of claim 1, wherein the hygroscopic material comprises a gel-forming polymer.

11. The fuel dispensing environment of claim 1, wherein the buffer material comprises sodium bicarbonate.

12. The fuel dispensing environment of claim 1, further comprising an air moving device disposed in the sump.

13. A method of preventing biocorrosion of fuel handling components located in a sump in a fuel dispensing environment, the method comprising the steps of:
   exposing a hygroscopic material to moisture-laden air in the sump such that the hygroscopic material deliquesces into a liquid solution;

exposing a buffer material to ethanol-blended fuel vapors in the sump;
collecting the liquid solution in a reservoir;
monitoring a level of the liquid solution in the reservoir using a liquid level sensor; and
notifying service personnel of the level of the liquid solution in the reservoir.

14. The method of claim 13, further comprising notifying service personnel of a future need for service.

15. The method of claim 13, further comprising drawing the liquid solution out of the reservoir via a tap.

16. The method of claim 13, wherein the buffer material reacts with organic acids found in the ethanol-blended fuel vapors.

\* \* \* \* \*